United States Patent
Cummings et al.

(10) Patent No.: US 6,768,701 B1
(45) Date of Patent: Jul. 27, 2004

(54) FLASHER-TYPE FISH FINDER WITH ZOOM FEATURE

(76) Inventors: Duane E. Cummings, 6871-97th St., NE., Monticello, MN (US) 55362; Raphael J. Marzean, 844 Katydid La., St. Michael, MN (US) 55376; Paul W. Thorne, 14435 Waconia St., NE., Ham Lake, MN (US) 55304

( * ) Notice: Subject to any disclaimer, the term of this patent is extended or adjusted under 35 U.S.C. 154(b) by 0 days.

(21) Appl. No.: 10/413,705

(22) Filed: Apr. 16, 2003

(51) Int. Cl.[7] ............................................. G01S 15/96
(52) U.S. Cl. ..................................................... 367/109
(58) Field of Search ................................... 367/99, 109

(56) References Cited

U.S. PATENT DOCUMENTS

| | | | |
|---|---|---|---|
| 5,459,479 A | | 10/1995 | Cummings .................. 367/108 |
| 5,999,490 A | * | 12/1999 | Shimauchi et al. ......... 367/109 |

* cited by examiner

*Primary Examiner*—Daniel Pihulic
(74) *Attorney, Agent, or Firm*—Thomas J. Nikolai; Nikolai & Mersereau, P.A.

(57) ABSTRACT

A flasher-type fish finder is provided with a zoom feature that allows the user to select an area of interest within a body of water and then display representations of the objects located within that area of interest.

12 Claims, 2 Drawing Sheets

FLASHER-TYPE FISH FINDER WITH ZOOM FEATURE

BACKGROUND OF THE INVENTION

I. Field of the Invention

The present invention relates to a sonar system of the flasher-type that is capable of displaying the bottom of a body of water and fish swimming in a body of water. More specifically, the present invention relates to a fish finder that is capable of selecting certain segments of the body of water and displaying representations of the fish swimming in that segment.

II. Description of the Related Art

Flasher-type fish finders have been available for many years. These systems universally include an ultrasonic transducer. The transducer performs several functions. First, it transmits sonar pulses in response to signals it receives from an oscillating circuit. The transducer also senses the return of the sonar pulses and, whenever it senses such a return, transmits a signal to a receiving circuit. Prior art flasher-type fish finders also include a control circuit that controls the oscillating circuit and processes signals it receives from the receiving circuit via an analog-to-digital converter. The controller processes these signals to determine the depth of the water and the depth at which fish are swimming. The controller also sends signals to a flasher display so that the depth of the body of water and the depth at which the fish are swimming can be displayed.

Flasher-type fish finders get their name from the type of display that is used. The display typically includes a housing having a ring-shaped window formed in the front. Mounted within the housing is a motor that turns a disk on which a light source such as a light emitting diode (LED) is mounted. Also mounted within the housing is a sensor that detects when the light source is at the top of the display.

The controller sends a signal to the oscillating circuit which, in turn, causes the transducer to emit an ultrasonic signal which propagates through the water. These ultrasonic signals "bounce" off of the bottom of the body of water and objects in the water and are returned to the transducer. The receiving circuit amplifies the returned signals. The amplified returned signals are converted to digital signals by the analog-to-digital converter and then delivered to the controller. Finally, when the sensor detects the light source is at the top of the display the controller delivers signals to the display whereby the depth of the bottom and objects such as fish in the water are displayed.

Prior art flasher-type fish finders of the type described above have proven to be economical and useful devices. However, they do not permit a user to carefully study in detail the number of fish swimming at a particular depth in the water. In other words, the typical flasher-type fish finder does not permit the user to zoom in and carefully study activity in particular depth ranges. While other fish finders have display systems (such as CRT or LCD type display systems) that do permit such study, there still exists a real need for a real-time fish finder that can provide such functionality.

SUMMARY OF THE INVENTION

The present invention provides a real-time flasher-type fish finder with a "zoom" feature. Specifically, the fish finder of the present invention divides the flasher display in half, displaying standard information on one-half and information related to activity in a selectably specified depth range on the other half of the display. For example, the user can select a depth range of interest and then define the size of the window at that depth range which is of interest. One side of the display reports all of the information generated. The other side of the display only reports returns falling within the selected window surrounding the selected range, for example, activity occurring with a 10 foot window surrounding a depth of 80 feet.

The manner in which the present invention performs this "zooming" function will be understood by those skilled in the art from a review of the following detailed description of the preferred embodiment.

DETAILED DESCRIPTION OF THE PREFERRED EMBODIMENT

Figure 1:
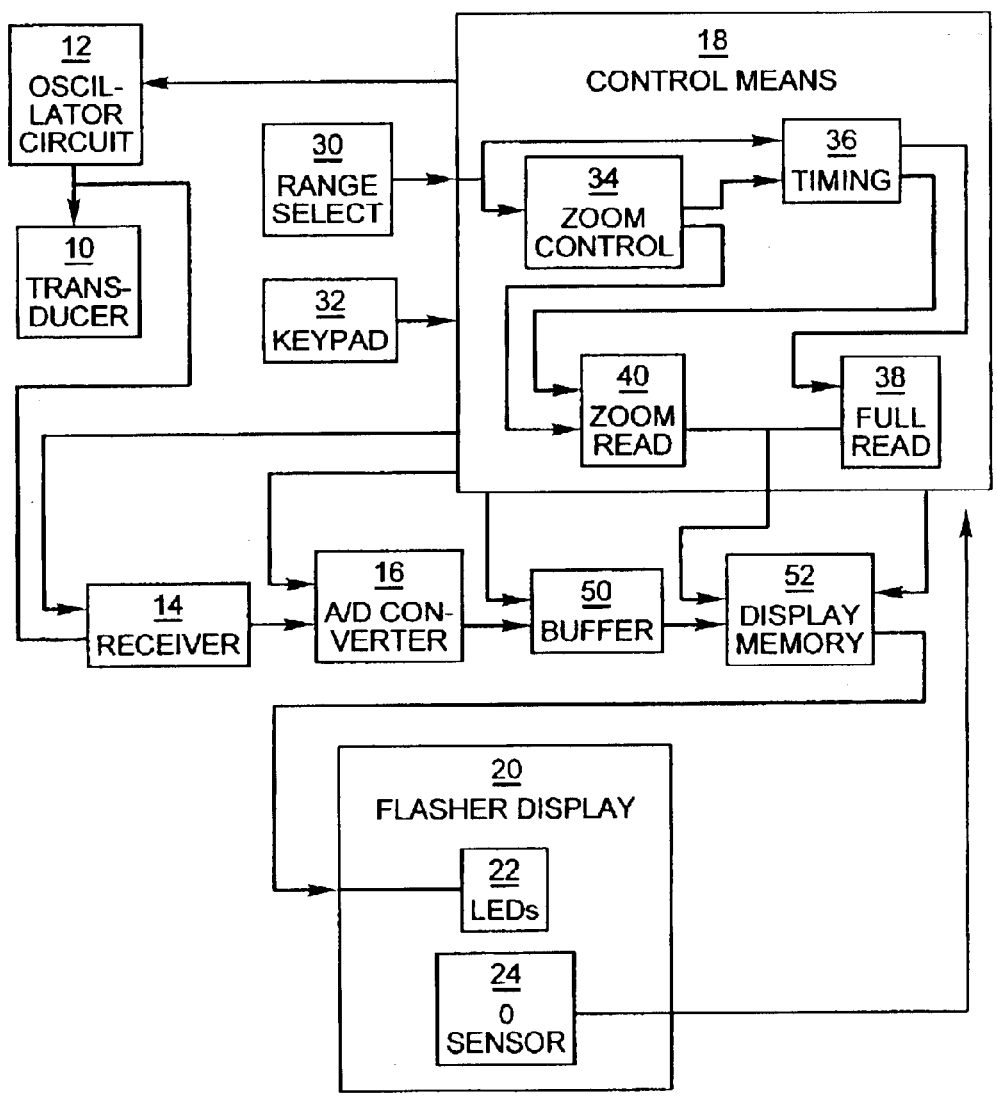
FIG. 1 is a block diagram of the fish finder of the present invention.
Figure 2:
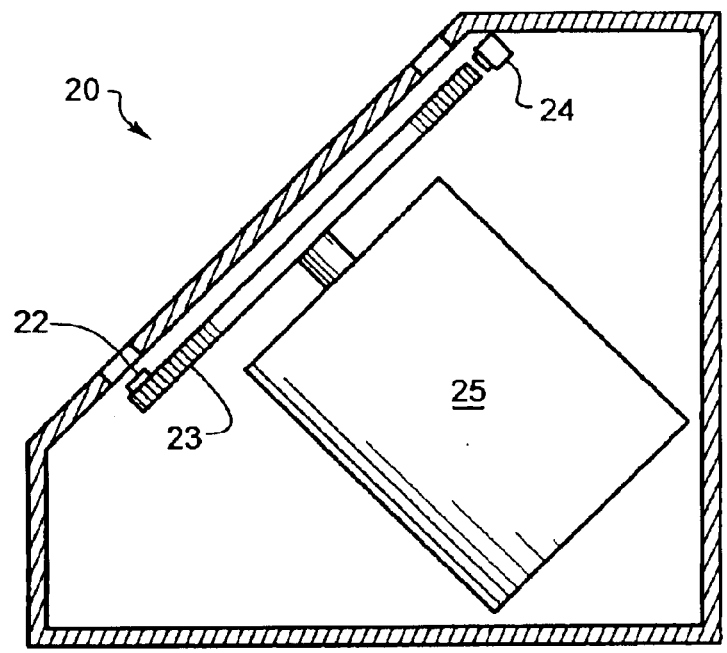
FIG. 2 is a cross-sectional side view of the flasher display referenced in FIG. 1.

FIG. 1 is a block diagram showing the flasher-type fish finder of the present invention. Like any typically flasher-type fish finder, it includes a transducer 10 for transmitting sound waves (i.e. sonar signals) through the water and for detecting the return of echo signals bouncing off the bottom or objects in the water such as fish. The transducer 10 generates sonar signals in response to signals it receives from oscillator circuit 12. Returns detected by the transducer 10 are forwarded to the receiver 14 in the form of an electrical signal. The receiver 14 amplifies the signals it receives from the transducer and delivers the amplified signals to an analog-to-digital converter. 16. The system of the present invention also includes a controller 18 and a flasher-type display 20 that has a set of LED's 22 mounted to a rotating disk 23 driven by a motor 25 and a position sensor 24 (see FIG. 2). A buffer 50 and display memory 52 are also provided.

When the zoom mode is not selected, this structure operates as it does in a standard flasher-type sonar system. Specifically, the controller 18, via the oscillator circuit 12, causes the transducer 10 to issue an ultrasonic pulse through the water. As echo returns of that signal are detected by the transducer 10, they are forwarded to and amplified by the receiver 14. They are then converted into digital signals by the analog-to-digital converter 16 and conveyed to a buffer 50. The controller 18 governs the sampling of the analog-to-digital converter 16 by the buffer 50. Data is also transferred from the buffer 50 to the display memory 52 at a time prescribed by the controller 18. Each time the sensor 24 detects a crossing of the zero point, the controller causes the data in the display memory to be read out to the display 20. This causes the LED's 22 to light when the disk of the display 20 is at the appropriate points of its rotation to indicate the depth of the bottom and the depth of objects, such as swimming fish, in the water.

The zoom feature of the present invention permits the user to define a specific "zoom window" of interest. The zoom window is defined by an upper depth boundary and a lower depth boundary. In one embodiment, this is accomplished using a range select switch 30 and a keypad 32, both of which are coupled to the controller. First, using the keypad 32, the user selects the zoom mode. Second, using the range selection switch 30, the user defines the depth that is of interest. In one embodiment of the invention, the user can select one of four available ranges—20 feet, 40 feet, 80 feet or 160 feet. Third, the user selects the size of the zoom window of interest using the keypad 32. In one example, the choices are 5 feet, 10 feet, 20 feet, or 40 feet. Fourth, the user can position the zoom window with respect to the selected range using keypad 32. User selection of the selected zoom window position(s) is given on the full range half of the display with the upper and lower window position indicators displayed.

To provide the zoom feature of the present invention, modifications to a standard controller are required. Thus, controller 18 includes zoom control logic 34 which operates in response to options selected by the user through actuation of the range select switch 30 and the keypad 32. Timing logic 36 is also required. The timing and ram pointer locations are calculated by controller 18 and stored in a "zoom read" location 40 and in "full read" locater 38. The controller uses the data stored in the "full read" locater 38 and the "zoom read" locater 40 to determine the data to be displayed in the zoom section of the display and the full range section of the display.

More specifically, to properly display both the "full read" data and the "zoom read" data simultaneously on a single flasher, additional control of the buffer 50 and a display memory 52 is provided. Sampling of the analog-to-digital converter 16 is governed by the controller 18 and the data is stored in the buffer 50. The contents of the buffer 50 ate transferred to the display memory 50 at a time prescribed by the controller 18. The controller 18 determines this time by the signals it receives from sensor 24 which indicate when the disk has reached the zero point.

In the zoom mode, the flasher display 20 is split into two areas. One-half of the flasher display 20 shows the full range data (i.e. controlled by the full read logic 38) and the other half of the flasher display shows the zoom range data (i.e. controlled by the zoom read logic 40). The controller 18 establishes the line separating the two halves. This line is defined by the zero point and a half way mark calculated by the controller 18. After each zero crossing, the controller 18 directs the contents of the display memory 52 to be read out to the flasher display 20. The full read data is read out first and the timing has been reduced by approximately one-half by the controller 18 such that this data is only displayed on one-half of the flasher display 20. The flasher display LED's 22 illuminate based upon the data stream from the display memory 52. When the half way mark calculated by the controller 18 is reached, the controller 18 reads the range, window size, window position and zoom settings to determine the correct zoom window and data corresponding to this zoom window is read out of the display memory 52 to the flasher display 20 in reverse order. The LED's 22 of the flasher display 20 illuminate in accordance with the data stream from the display memory 52 to display the data for the zoom window on the second half of the flasher display.

When in zoom mode, the present invention splits the display into two display areas. The first is the full range area and the second is the zoom area. By going to the zoom mode the user is able to enlarge/enhance the viewability of a given window within the selected range. This zooming window does not improve the actual target separation of a received signal, instead it magnifies the display data. To improve target separation, the software detects the zoom mode and calculates the best transmit pulse length given the available display ram and the zoom window size. The pulse length of the sound waves generated by the transducer are modulated based upon this calculation to improve target separation. This calculation gives greatly improved display resolution/target separation.

Figure 3:
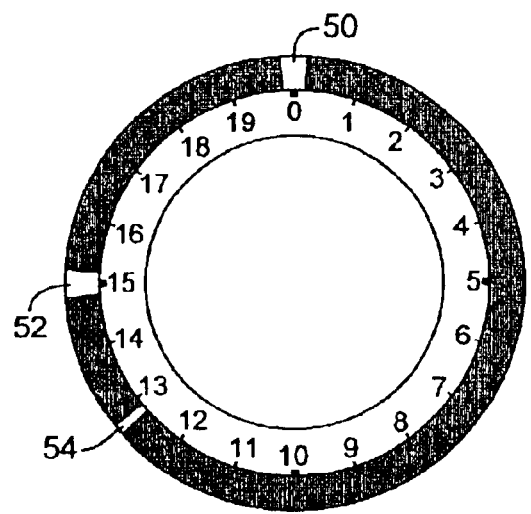
FIG. 3 is a front view of the display and the flasher display of the present invention showing the display when the device is in the normal mode.
Figure 4:
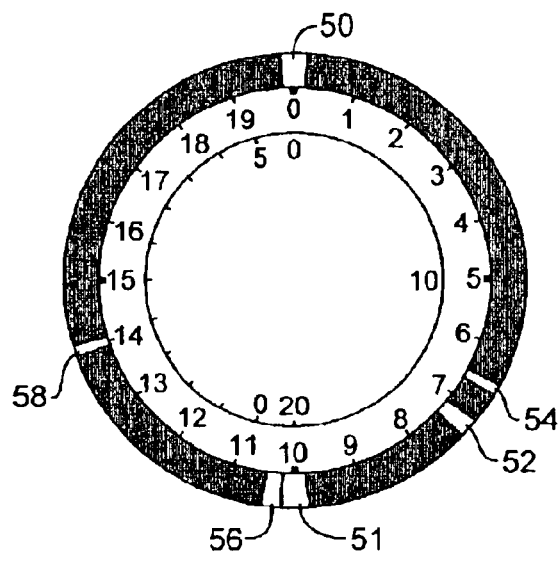
FIG. 4 is a front view of the display panel of the flasher display when the device is in the zoom mode.

FIGS. 3 and 4 show examples of displays generated by the present invention. The example shown in FIG. 3 assumes the device is in its normal operating mode and the user has set the range to twenty feet. These items are displayed: the surface 50 of the water at zero feet, the bottom 52 of the body of water at fifteen feet; and fish 54 swimming at approximately thirteen feet.

The example shown in FIG. 4 assumes the device is in the zoom mode and a five foot window has been established. The right hand side of the display provides the same information provided in FIG. 3 but using only one-half of the display. The surface 50 of the water is still shown at zero at the top. The bottom of the twenty foot depth range 51 is now at the bottom of the display. The fifteen foot bottom 52 of the body of water and the fish 54 swimming at thirteen feet are also shown. The left half of the display, however, now again shows the lake bottom at 56 at fifteen feet and the fish 58 swimming at thirteen feet.

While the description of the preferred embodiment provided above contemplates that the user will want to display both the full range of returns and the returns from the zoom window simultaneously, this is not necessarily the case. For example, the user may only wish to display the returns for the zoom area and use both halves of the display to do so. The user can make this selection using the key pad 32. When this selection is made, the display memory only reads the data corresponding to the zoom window to the display and does so each time the zero point is detected.

Similarly, there may be times when the user wants to monitor two distinct zoom windows simultaneously. Again, the key pad 32 can be used to select this mode of operation. When this mode of operation is selected, one zoom window is displayed on one-half of the display and the other zoom window is displayed on the other half of the display. The controller divides the display in half based upon received sensor signals and instructs the display memory 52 to read out for display what data and when.

Other modes of operation can also be adopted without deviating from the invention. The controller 18 can use signals received from sensor 24 to divide the display into any number of segments. For example, if the use r so desires, one-third of the display can be used to show all of the returns, another third of the display can be used to show the returns for a first zoom window, and the final third of the display can be used to show the returns for a second zoom window.

What is claimed is:

1. A flasher type depth locator that provides a real time display of targets in at least one selectable area of interest of a body of water, said flasher-type depth locator comprising:
   a. a transducer that transmits sound waves into a body of water, detects the return of echo signals from targets in the path of said sound waves, and provides first electrical signals in accordance with the detected echo signals;
   b. an oscillator circuit coupled to said transducer;
   c. a receiver coupled to said transducer for amplifying said first electrical signals;
   d. an analog-to-digital converter for converting said first electrical signals into digital signals;

e. a buffer for storing said digital signals;

f. memory coupled to said buffer;

g. a flasher-type display coupled to said memory, said flasher-type display having a sensor for detecting the zero position;

h. a controller that cooperates with said oscillator to control the transmission of sound waves by said transducer and controls the read out of digital signals from said buffer to said memory and from said memory to said flasher-type display;

i. an input device coupled to the controller to define at least one selectable area of interest of a body of water by defining the depth of said selectable area of interest and the size of said selectable area of interest; and j. wherein said controller controls said buffer, said memory and said flasher-type display to display based upon signals received from said sensor the depth of targets detected in said at least one selectable area of interest.

2. A flasher type depth locator that provides a real time display of targets in at least one selectable area of interest of a body of water, said flasher-type depth locator comprising;

a. a transducer that transmits sound waves into a body of water, detects the return of echo signals from targets in the path of said sound waves, and provides first electrical signals in accordance with the detected echo signals;

b. an oscillator circuit coupled to said transducer;

c. a receiver coupled to said transducer for amplifying said first electrical signals;

d. an analog-to-digital converter for converting said first electrical signals into digital signals;

e. a buffer for storing said digital signals;

f. memory coupled to said buffer;

g. a flasher-type display coupled to said memory, said flasher-type display having a sensor for detecting the zero position;

h. a controller that cooperates with said oscillator to control the transmission of sound waves by said transducer and controls the read out of digital signals from said buffer to said memory and from said memory to said flasher-type display;

i. an input device coupled to the controller to define at least one selectable area of interest of a body of water by defining the depth of said selectable area of interest and the size of said selectable area of interest; and j. wherein said controller controls said buffer, said memory and said flasher-type display to display based upon signals received from said sensor the depth of the targets detected on one part of the display and the depth of targets detected in said at least one selectable area of interest on another part of the display.

3. A flasher type depth locator that provides a real time display of targets in at least one selectable area of interest of a body of water, said flasher-type depth locator comprising:

a. a transducer that transmits sound waves into a body of water, detects the return of echo signals from targets in the path of said sound waves, and provides first electrical signals in accordance with the detected echo signals;

b. an oscillator circuit coupled to said transducer;

c. a receiver coupled to said transducer for amplifying said first electrical signals;

d. an analog-to-digital converter for converting said first electrical signals into digital signals;

e. a buffer for storing said digital signals;

f. memory coupled to said buffer;

g. a flasher-type display coupled to said memory, said flasher-type display having a sensor for detecting the zero position;

h. a controller that cooperates with said oscillator to control the transmission of sound waves by said transducer and controls the read out of digital signals from said buffer to said memory and from said memory to said flasher-type display;

i. an input device coupled to the controller to define a plurality of selected areas of interest in a body of water; and j. wherein said controller controls said buffer, said memory and said flasher-type display to display based upon signals received from said sensor the depth of targets detected in each of said plurality of selected areas of interest on said display, each of said selected areas of interest being represented on a different portion of the display.

4. The flasher-type depth locator of claim 1 wherein the selected areas of interest are defined by an upper depth boundary and a lower depth boundary.

5. The flasher-type depth locator of claim 2 wherein the selected areas of interest are defined by an upper depth boundary and a lower depth boundary.

6. The flasher-type depth locator of claim 3 wherein the selected areas of interest are defined by an upper depth boundary and a lower depth boundary.

7. The flasher-type depth locator of claim 1 wherein the display of the depth of targets detected in said at least one selectable area of interest on said another part of the display is magnified.

8. The flasher-type depth locator of claim 1 wherein the pulse length of the sound waves transmitted by the transducer is modulated based upon the size of a selectable area of interest defined using said input device.

9. The flasher-type depth locator of claim 3 wherein the display of the depth of targets detected in at least one of said plurality of selected areas of interest is magnified on the portion of the display associated with said at least one of said plurality of selected areas of interest.

10. The flasher-type depth locator of claim 2 wherein the display of the depth of targets detected in said at least one selectable area of interest on said another part of the display is magnified.

11. The flasher-type depth locator of claim 2 wherein the pulse length of the sound waves transmitted by the transducer is modulated based upon the size of a selectable area of interest defined using said input device.

12. The flasher-type depth locator of claim 3 wherein the pulse length of the sound waves transmitted by the transducer is modulated based upon the size of a selectable area of interest defined using said input device.

* * * * *